Figure 1:
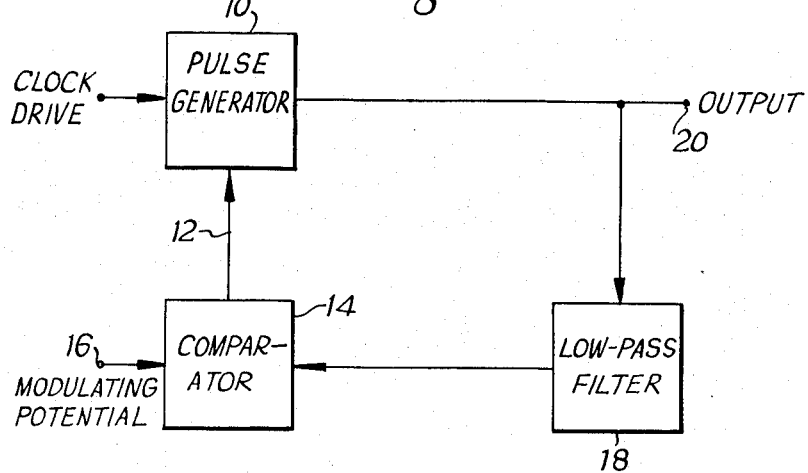

May 3, 1966     J. V. CORNEY     3,249,895
LINEAR PULSE WIDTH MODULATOR
Filed June 11, 1963     6 Sheets-Sheet 1

INVENTOR
JAMES VICTOR CORNEY
BY
ATTORNEY

May 3, 1966  J. V. CORNEY  3,249,895
LINEAR PULSE WIDTH MODULATOR
Filed June 11, 1963

INVENTOR
JAMES VICTOR CORNEY

ATTORNEY

May 3, 1966  J. V. CORNEY  3,249,895
LINEAR PULSE WIDTH MODULATOR
Filed June 11, 1963  6 Sheets-Sheet 6

INVENTOR
JAMES VICTOR CORNEY
BY
Spencer E. Olson
ATTORNEY

United States Patent Office 3,249,895
Patented May 3, 1966

3,249,895
LINEAR PULSE WIDTH MODULATOR
James Victor Corney, London, England, assignor to Ferguson Radio Corporation Limited, London, England, a British company
Filed June 11, 1963, Ser. No. 287,112
11 Claims. (Cl. 332—9)

The present invention relates to pulse width modulators, "pulse width" being used with its customary connotation of "pulse duration." The invention concerns circuits adapted to produce pulses in response to applied clock pulses of constant repetition frequency and in which the pulse width can be varied linearly in response to an applied potential which will be called the modulating potential in this specification even though, in some uses of the modulator the signal may be regarded more as a reference or control signal. With proper choice of components, the width can readily be varied from 5% to 95%, expressing the width as a mark-to-period ratio, that is to say the ratio of the pulse duration to the clock period.

The circuit according to the invention can be used for pulse-width modulation in data transmission and recording. Also the circuit lends itself to the provision of a regulated voltage which may either be obtained directly from the pulses of modulated or controlled width by smoothing or may be obtained by smoothing the output of a power switch operated by these pulses. In the latter case it can be arranged to apply either open loop control or closed loop control to the smoothed output of the power switch.

The linear pulse width modulator according to the invention comprises a pulse generator having a capacitor which is charged (or discharged) by each of a succession of clock pulses and thereafter discharges (or charges) at a rate determined by the difference between a modulating voltage and a negative feedback voltage derived by smoothing the generated pulses (or other pulses obtained therefrom) in a low pass filter, the voltage across the capacitor controlling a device which switches between highly conductive and poorly conductive states to provide the generated pulses in which a space-to-mark transition occurs as the capacitor is charged (or discharged) by a clock pulse and a mark-to-space transition occurs when the capacitor subsequently discharges (or charges) to a datum level.

The rate at which the capacitor discharges (or charges) can be controlled by a transistor acting as a comparator, the modulating potential and the smoothed potential being applied to the base and emitter so as to obtain a varying control current in the collector lead, this current providing the discharging (or charging) current. Alternatively the thermionic vacuum tube equivalent can be used.

Figure 2:
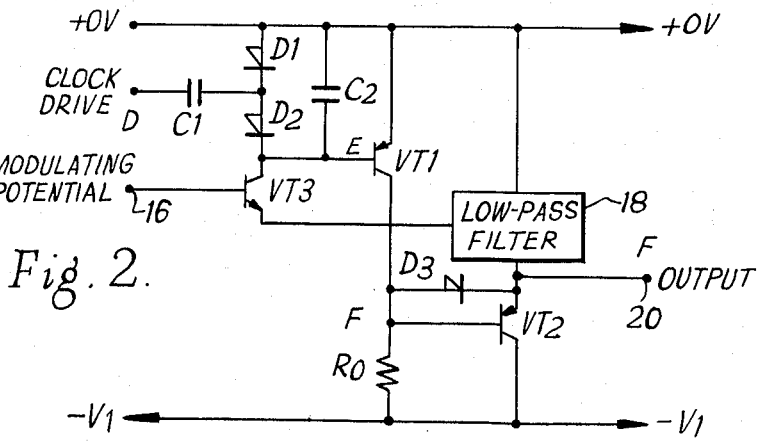
Figure 3:
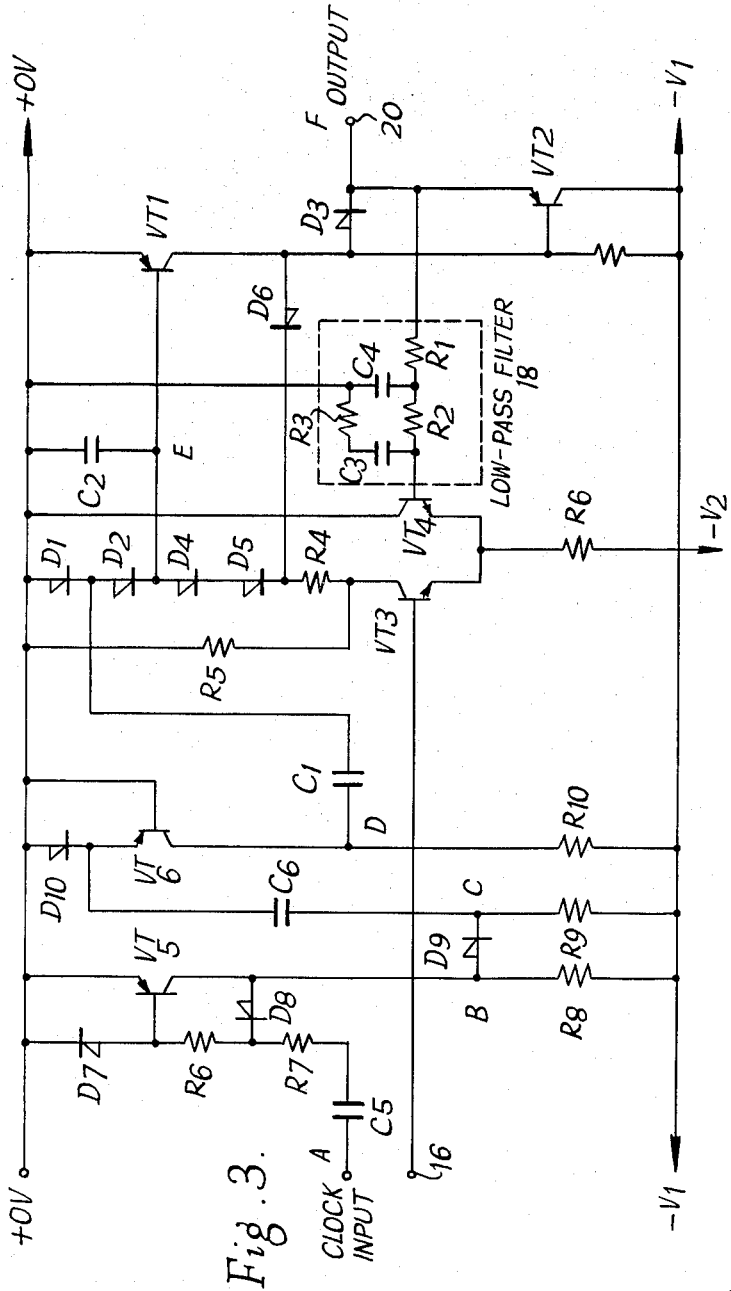
Figure 4:
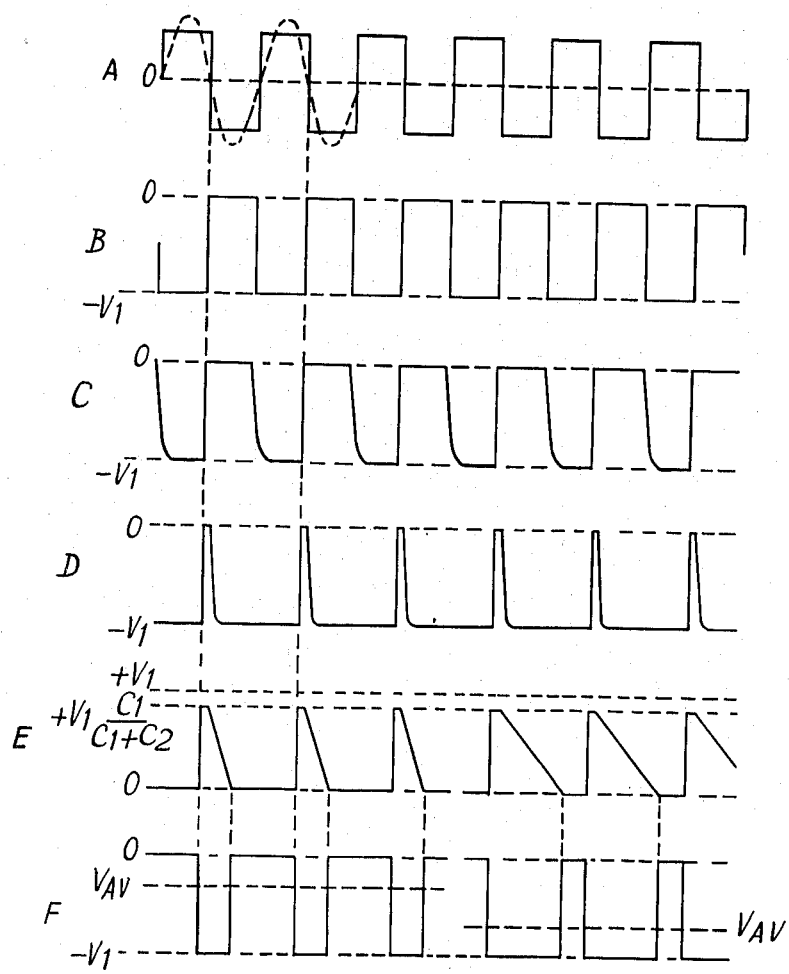
Figure 5:
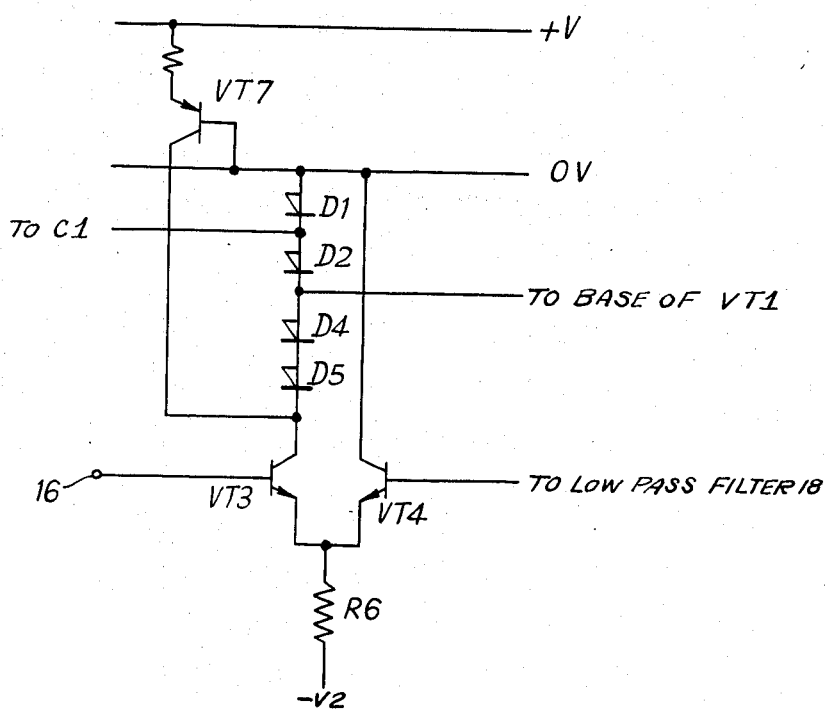
Figure 6:
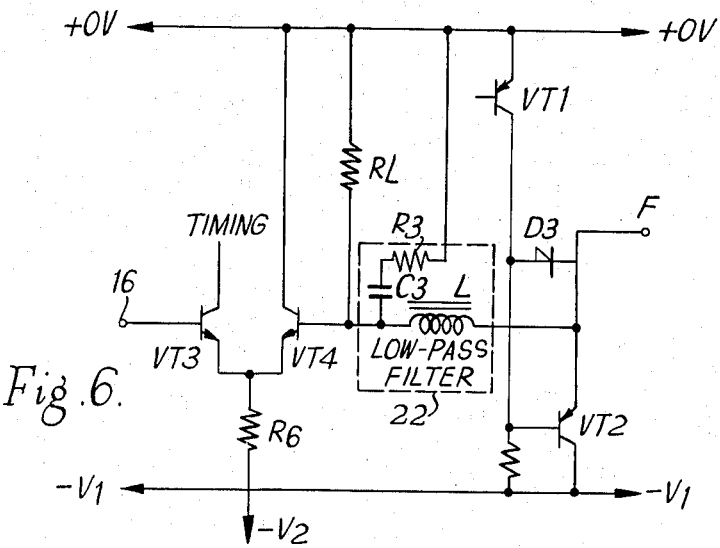
Figure 7:
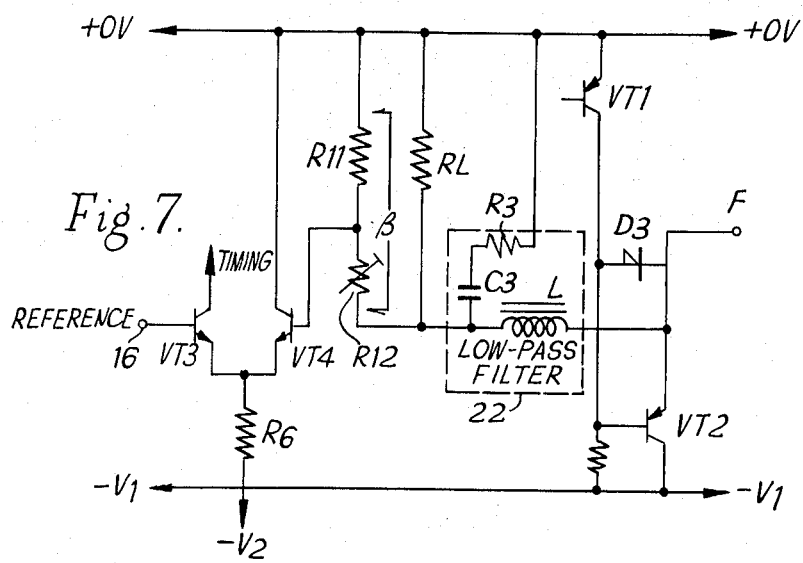

It will be appreciated that, if the rate at which the capacitor discharges (or charges) is increased, the pulse width decreases because the mark-to-space transition necessarily occurs earlier, and conversely. Moreover the negative feedback ensures that linearity is good, in spite of the use of highly non-linear devices in the circuit. This point will be elaborated in the following detailed description given by way of example with reference to the accompanying drawings, in which:

FIG. 1 is a block diagram illustrating the essential features of the invention,
FIG. 2 is a circuit diagram of one simple embodiment,
FIG. 3 is a circuit diagram of a more elaborate embodiment,
FIG. 4 is an explanatory diagram showing various waveforms,
FIGS. 5, 6 and 7 show various modifications which can be made to FIG. 3, and
FIGS. 8, 9 and 10 show three regulated power supply circuits based upon the modulator of this invention.

In FIG. 1 a pulse generator 10 is driven "on" at regular intervals by narrow clock pulses, each of which thus initiates a generated pulse. The duration of each pulse is determined by a capacitor-discharging (or charging) control signal provided in a line 12 by means of a comparator 14. This compares a modulating potential applied to a terminal 16 with the output of a low-pass filter 18 which smoothes the output pulses produced at the terminal 20 by the generator 10.

Under steady-state conditions the feedback adjusts the mark-to-period ratio of the generated pulses to a value such that the mean direct potential of the generated pulse-train is substantially equal to the modulating potential. If the rise and fall times of the generated pulses are each a negligible proportion of the clock period, the mark-to-period ratio of the generated pulse-train is linearly proportional to the control, reference or modulating potential. The loop gain of the system and the characteristics of the low-pass filter 18 govern the accuracy with which the generated mark-to-period ratio follows variations in the modulating potential.

FIG. 2 shows one embodiment of the system. Transistor VT1 is an "off" driven pulse-generator with collector load Ro and VT2 is an output emitter-follower. A diode D3 by-passes the base-emitter junction of VT2 if this becomes reverse biased due to capacitive emitter loads. The clock-pulse input consists of narrow, positive going pulses from a low-impedance source (Waveform D, FIG. 4). Diodes D1 and D2 act as a "diode pump," charging C2 from C1 at each clock-pulse. C2 charges through diode D2, reverse biasing the base-emitter junction of VT1. This drives VT1 "off" and the transistor does not conduct again until C2 has discharged as subsequently described. The initial positive potential produced at the base of VT1 by each clock-pulse approaches $C1/(C1+C2)$ times the clock-pulse amplitude. At the finish of a clock-pulse D2 is reverse-biased and C1 recharges through D1. C2 is discharged slowly in each clock-pulse period by the collector current of transistor VT3 which is the voltage-comparator 14 of FIG. 1, forward conduction in VT1 base-emitter junction "catching" VT1 base potential substantially at the +OV bus potential. The voltage waveform at VT1 base is then waveform E, FIG. 4, the resulting collector potential at VT1 and the output waveform being waveform F.

It will be seen that increase of VT3 collector current reduces the discharge-time of C2 reducing the durations of the negative-going output pulses and so reducing the mean negative component of the output wave-train. This tends to reverse-bias the emitter-base junction of comparator VT3, offsetting the increase in its collector current. Similarly, a fall in VT3 collector current lengthens the negative-going output pulses, increasing the mean negative component of the output wave-train. This increases the forward bias on comparator VT3 emitter-base junction, offsetting the fall in its collector current. Hence the feedback to VT3 emitter is degenerative and the system will stabilize the generated mark-to-period ratio at a value such that the mean value of the generated voltage pulse-train is substantially equal to the modulating potential at VT3 base. The mark-to-period ratio of the generated wave-train must vary to sustain this equality, and so will vary linearly with the negative potential at the terminal 16. If there is negligible D.C. loss in the low-pass filter 18, variation in the control potential from almost zero to almost $-V1$ will change the generated mark-to-period ratio linearly from almost zero to almost unity.

The mean loop gain of the feedback arrangement can be expressed as $\Delta \overline{V}/\Delta Vbe$ where $\Delta V$ is the change in the smoother potential produced by the filter in going from minimum to maximum mark-to-period ratios, say from 5% to 95%. If $-V1$ is $-11$ volts, $\Delta \overline{V}$ is 9.9 volts. The corresponding $\Delta \overline{V}be$, where $Vbe$ is the base-emitter potential of VT3 will typically be in the region of 100 mv. If VT3 is type OC42 the value obtained from the published characteristics is 125 mv. which gives a loop gain $A \equiv 79$. Non linearities in the feedback loop are reduced by a factor of $1/(1+A)$, that is 1/80. The resultant non-linearity of the modulator is necessarily small therefore.

The OC42 is in fact markedly non-linear as a voltage-operated device and if its non-linearity is expressed as $100 \times \delta Vbe/\Delta Vbe$ where $\delta Vbe$ is the difference between $Vbe$ at 50% mark-to-period ratio and the mean of $Vbe$ at 5% and 95% mark-to-period ratio, a value of approximately 25% is obtained. With the calculated loop gain the non-linearity is clearly reduced to less than 1% and a detailed working through on the basis of the published characteristics leads to a non-linearity with the feedback of 0.3%, expressed in the same way.

A more elaborate version of the arrangement of FIG. 2 including drive circuits, is shown in FIG. 3. Corresponding components and signal-waveforms in FIG. 2 and FIG. 3 are similarly identified. In FIG. 3 an emitter follower VT4 is interposed between the emitter of comparator VT3 and the output of low-pass filter 18 to reduce the direct current flow in the latter. VT3 and VT4 now constitute a differential amplifier with a common emitter resistor R6 returned to a potential $-V2$ more negative than the supply potential $-V1$ to provide adequate available current for VT3 when the control potential approaches $-V1$. Diodes D4, D5 and D6 are added to limit bottoming in VT3 and so to reduce the effects of excess carrier storage. R5 allows VT3 to operate at a collector current well above its thermally dependent leakage component $Ico$ or $Ico'$. Assuming the voltage-drop across diodes D1, D2, D4 and D5 to be small relative to that across R4, the conductance ratio between R4 and R5 decides the division of VT3 collector current between VT1 base circuit and R5.

The low-pass filter 18 is shown as a two-stage integrator. The second stage is in effect a "lag-lead" network because of resistor R3, choice of which affects the transient response of the system. (See "Single-Bit Delta-Modulating System," Electronics, 17.11.61., pages 125 et seq. and FIG. 1D; but note that the systems there described integrate numbers of pulses of fixed duration rather than pulses of constant repetition frequency but variable width.)

In the circuit of FIG. 3 the clock input, waveform A, FIG. 4, may be sinusoidal or square, as is convenient. VT5 is n inverter/squarer; D7 offsets rectification at VT5 base-emitter junction, which would render the angle of flow of current in VT5 dependent on sinusoidal drive amplitude. D8 and R6 and R7 limit saturation and excess carrier-storage in VT5. VT5 collector waveform is shown as waveform B, FIG. 4. D9 is a diode added in accordance with the teaching of British Patent No. 790,941 to decouple the collector of VT5 from capacitive loading by C6 in the "Off" state.

When VT5 is driven "on" diode D9 conducts, discharging C6 into VT6 emitter, VT6 discharges C1 through D2 and C2 and, neglecting the effects of currents in R9 and R10, "bottoms" if $C_6 > 1/\alpha \cdot (C_1C_2)/(C_1+C_2)$ where $\alpha$ is the common base current-gain of VT6. This stabilizes the charges injected into C2 and C1 in series, so that C1 charges substantially to $+C1V1 (C1+C2)$ volts, reverse biasing VT1 base-emitter junction.

When VT5 "bottoms," current in C6 and VT6 ceases; C1 recharges to $-V_1$ volts through R10 and diode D1 (Waveform D, FIG. 4). Timing capacitor C1 is discharged slowly by VT3, definining the duration of the negative going output pulse. When VT5 is driven "off" by the input waveform A, FIG. 4, the diode D9 disconnects C6 from VT5 collector, so that a fast-negative-going edge is available at VT5 collector if required. Capacitor C6 re-charges to $-V1$ volts through "pump" diode D10 and resistor R9. The waveform appearing at the junction of C6 and R9 is shown as waveform C, FIG. 4. The remaining waveforms D, E and F correspond with those of the circuit of FIG. 2. The feedback adjusts the output mark-to-period ratio to be such that the potentials at the bases of VT3 and VT4 are substantially equal.

In the modification illustrated in FIG. 5, the resistor R5 is replaced by a constant-current source in the form of a transistor VT7 and, as the voltage drop across the transistor is small, R4 is removed. The constant current flowing through VT7 is supplied by the collector current of VT3 which accordingly has to operate in a higher range of its operating characteristics where (in the case of a type OC42 for example) the collector current versus base-emitter potential characteristic is steeper giving a higher loop gain and hence an improvement in linearity. With this improvement linearities of less than 0.1% (expressed as above) may be expected.

Another way of increasing the loop gain is to replace VT3 by a series of cascaded transistors, three for example. In this case it is important to give the final transistor (which discharges the capacitor C2) a substantial standing current, as by the transistor VT7 of FIG. 5. Otherwise the first transistor will be operating 10 low down on its characteristic as to have very low gain which will offset the advantage sought for in using several transistors, in cascade.

The systems described have obvious applications as pulse-duration modulators in data transmission and recording. They also have direct application as D.C. stabilizers or controllers. Thus, if, in place of the resistance-capacitance filter 18 of FIG. 3 an LCR filter 22 is used as shown in FIG. 6 and a load resistor $R_L$ is connected between the base of VT4 and the $+0V$ rail, the system functions as a "chopper" type controller of the direct voltage across $R_L$. The mark-to-period ratio of waveform F is set by the feedback to make the direct voltage across $R_L$ substantially equal to the modulating (reference) signal at VT3 base, so that variation of this reference signal controls the voltage across $R_L$. The emitter-follower VT2 becomes the source of bulk power for $R_L$, and smoothing is provided by the low-pass filter 22. Similarly, in FIG. 7 a fraction $1/\beta$ of the voltage across $R_L$ is equated to the reference voltage at VT3 base by the feedback action. The fractional voltage is derived by means of a potential divider comprising fixed resistor R11 whose value is taken as 1 and a variable resistor R12 whose value is $\beta - 1$. The reference signal on terminal 16 may now be a fixed potential derived, for example, from a Zener diode and the output potential across $R_L$ may be adjusted by adjustment of R/12 to vary $\beta$. In either case change in the value of $R_L$ will cause change in the mark-to-period ratio of waveform F in such sense as to sustain the direct potential of VT4 base substantially equal to that at VT3 base; thus the system presents a low output impedance to the load $R_L$.

Figure 8:
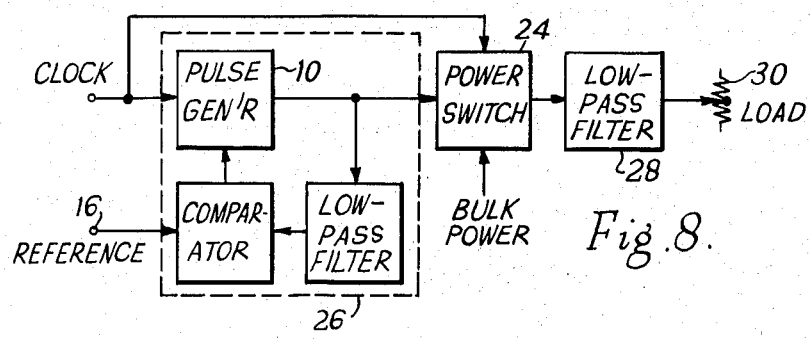

The system may be used also as part of a heavy-duty voltage controller or regulator. For example, FIG. 8 shows an "open-loop" controller in which a higher power "chopper" type power switch 24 is controlled at least in part by a system 26 such as that of FIG. 2 or FIG. 3. The power switch 24 may consist, for example, of a pair of mutually inhibiting silicon controlled rectifiers or a pair of thyratrons or ignitrons, triggering of the first of which connects a bulk D.C. power supply to the input of a low-pass filter 28 while triggering the second renders the first non-conductive. This bulk power switch may be triggered "on" by the same clock pulse which drives the pulse-generator 10, derived, for example, from the collector of VT6 of FIG. 3 or from the positive going edge of waveform B at VT5 collector, FIG. 3. The "off" trigger for the bulk power switch is then derived from the positive-going edge of waveform F, FIGS. 3 and 4. An alternative arrangement is to trigger the power switch on at the time of the positive-going edge of the waveform F and off by the clock pulse. Adjustment of the reference signal in FIG. 8 controls the mark-to-period ratio of bulk power application to the load 30 via the low-pass filter 28 from values near zero to values near unity.

Figure 9:
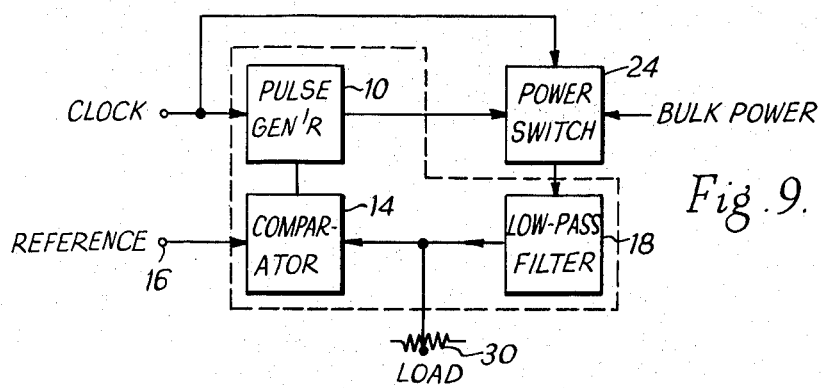

The bulk power switch may be introduced as in FIG. 9 as an extra stage within the feedback loop of the systems of FIG. 2 and FIG. 3. Triggers for the power switch are derived as described for FIG. 8, but feedback to VT4 base, FIG. 3, is derived from the load as in FIG. 6 or FIG. 7. The power switch and its bulk power supply provide a "chopper" input to the low-pass filter 18, which provides smoothing. The source resistance of the bulk power supply and the load-current smoothing choke are now included within the feedback loop, giving improved regulation against load changes. If the mode of operation of the added stage is such that it inverts the sense of the open-loop transfer characteristic, this may be accommodated by transposing the connections of the collectors (or of the bases) of VT3 and VT4 in FIG. 3.

Figure 10:
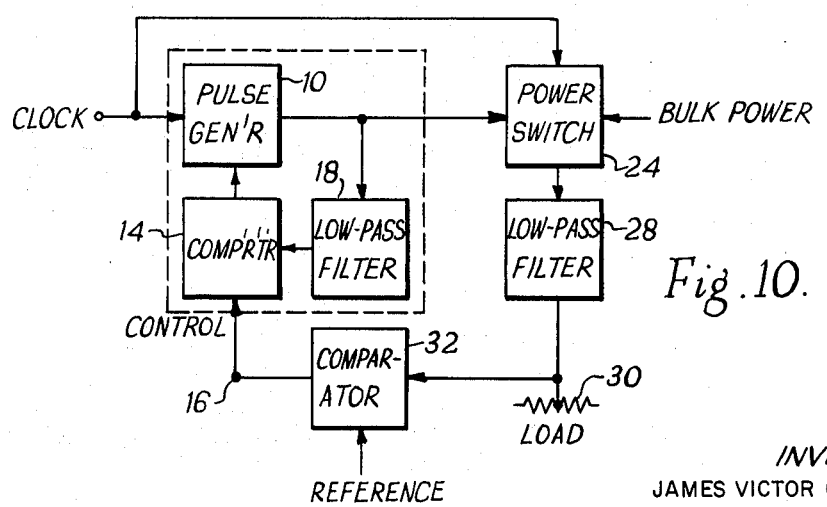

Finally, the systems of FIG. 2 or FIG. 3 may be used, as in FIG. 10, as one element of an overall feedback loop including the bulk power supply, the power-switch 24, the heavy current, low pass filter 28 and a main loop comparator 32. Here comparator 32 compares the load volts with a suitable reference signal to produce an error correcting control-signal forming the modulating signal for the circuit of FIG. 2 or FIG. 3 which varies the generated mark-to-period ratio in such wise as to maintain the load volts substantially equal to the reference-signal applied to comparator 32.

The power switches 24 of FIGS. 8 to 10 can, of course, be any suitable control devices such as silicon controlled-rectifier pairs, thyratron or ignition pairs, etc., or, if switched directly by waveform F of FIGS. 2, 3 and 4, may be thermionic vacuum tubes, transistors, electro-magnetic contactors, saturable reactor type controllers etc. Such power switches are well known components of voltage regulators, as are circuits such as the low-pass filter 28 and the comparator 32. These components and circuits are therefore only illustrated in block form.

I claim:

1. A circuit for producing variable width pulses in response to applied clock pulses and an applied control signal comprising,
   a capacitor,
   means responsive to each of a succession of clock pulses to alter the charge on the capacitor abruptly in one sense,
   means for altering the charge on the capacitor in the other sense at a controlled rate following each clock pulse,
   switching means responsive to the voltage across the capacitor to switch between highly conductive and poorly conductive states to generate pulses of modulated width in which a space-to-mark transition occurs as the charge alters in said one sense and in which a mark-to-space transition occurs when the charge alters in said other sense to a datum level,
   a low pass filter operative in response to said generated pulses to provide a negative feedback voltage, and
   means responsive to the difference between said negative feedback voltage and said applied control signal to vary the rate at which the charge on the capacitor changes in the other sense.

2. A pulse width modulator according to claim 1, in which the said mentioned means includes, a three-terminal electronic device with its first control terminal connected to the control signal, its second terminal connected to the feedback voltage and its third terminal connected to discharge the capacitor through the switching means, the terminals being so biased that the difference in voltage between the first and second terminals controls the current flow through the switching means between the first and third terminals.

3. A pulse width modulator according to claim 1 in which the said last mentioned means includes,
   a transistor with its base connected to the control signal and its emitter connected to the feedback voltage.

4. A pulse width modulator according to claim 1 in which the said last mentioned means includes,
   a long tailed pair of devices each with a control terminal, the feedback voltage being applied to the control terminal of one device and the control signal being applied to the control terminal of the other device.

5. A voltage regulator comprising:
   a load,
   a power switch which passes power to the load, a pulse width modulator according to claim 1, controlling the power switch, variation of the applied control signal changing the duration of the pulses and therefore the mean voltage applied to the load.

6. A voltage regulator according to claim 5, further comprising an additional low pass filter between the power switch and the load.

7. A voltage regulator and controller comprising:
   a pulse width modulator according to claim 1,
   a power switch controlled by the modulator to produce power pulses,
   an additional low pass filter which smoothes the power pulses so providing a load voltage,
   a comparator which compares the load voltage with a reference voltage and whose output provides the said applied control signal for the linear pulse width modulator so that variations in the load voltage produce variations in the applied control signal to the pulse width modulator so producing compensating changes in the intervals in which the power switch passes power, thus stabilizing the output voltage, and changes in the reference voltage change the intervals in which the power switch passes power, thus changing the output voltage.

8. A linear pulse width modulator comprising:
   a capacitor,
   means responsive to each of a succession of clock pulses to alter the charge on the capacitor abruptly in one sense,
   means for altering the charge on the capacitor in the other sense at a controlled rate following each clock pulse,
   a switching device responsive to the voltage across the capacitor to switch between highly conductive and poorly conductive states to generate pulses of modulated width in which a space-to-mark transition occurs as the charge alters in said one sense and in which a mark-to-space transition occurs when the charge alters in said other sense to a datum level,
   an integrating means to produce a negative feedback voltage from the generated pulses, and
   means responsive to the difference between the negative feedback voltage and an applied voltage to control said rate at which the charge on the capacitor changes in the other sense.

9. A linear pulse width modulator comprising:
   a capacitor,
   means responsive to each of a succession of clock pulses to alter the charge on the capacitor abruptly in one sense,
   means for altering the charge on the capacitor in the other sense at a controlled rate following each clock pulse,
   a switching device responsive to the voltage across the capacitor to switch between highly conductive and poorly conductive states to generate pulses of modulated width in which a space-to-mark transition occurs as the charge alters in said one sense and in which a mark-to-space transition occurs when the charge alters in said other sense to a datum level, means synchronized to said switching device to provide further pulses of the same period and width as said generated pulses, a low pass filter for smoothing said further pulses to provide a negative feedback voltage, and means responsive to the difference between the negative feedback voltage and an applied voltage to control said rate at which the charge on the capacitor changes in the other sense.

10. A voltage controller and regulator comprising:

a capacitor, means responsive to each of a succession of clock pulses to alter the charge on the capacitor abruptly in one sense, means for altering the charge on the capacitor in the other sense at a controlled rate following each clock pulse, a switching device responsive to the voltage across the capacitor to switch between highly conductive and poorly conductive states to generate pulses of modulated width in which a space-to-mark transition occurs as the charge alters in said one sense and in which a mark-to-space transition occurs when the charge alters in said other sense to a datum level, a low pass filter for smoothing said generated pulses to provide a negative feedback voltage, a load connected at the output of the low pass filter, variations in the load impedance changing the negative feedback voltage, a means responsive to the difference between the negative feedback voltage and an applied potential to control said rate at which the charge on the capacitor changes in the other sense, so that if the load impedance changes the duration of the pulses generated changes but the feedback voltage, which is also applied to the load, remains unchanged, and if the applied voltage is changed and the load impedance remains constant, the duration of the pulses generated changes and the voltage applied to the load also changes.

11. A voltage regulator and controller comprising:

a capacitor, means responsive to each of a succession of clock pulses to alter the charge on the capacitor abruptly in one sense, means for altering the charge on the capacitor in the other sense at a controlled rate following each clock pulse, a switching device responsive to the voltage across the capacitor to switch between highly conductive and poorly conductive states to generate pulses of modulated width in which a space-to-mark transition occurs as the charge alters in said one sense and in which a mark-to-space transition occurs when the charge alters in said other sense to a datum level, a power switch controlled by the generated pulses to provide power pulses, a low pass filter for smoothing the power pulses to provide a load voltage which is also used as a negative feedback voltage, and means responsive to the difference between the negative feedback voltage and an applied voltage to control the rate at which the charge on the capacitor changes in the other sense so that variations in the load, that is negative feedback voltage, produce compensating changes in pulse width and the load voltage is stabilized, and changes in the applied voltage produce changes in pulse width so changing the load voltage.

References Cited by the Examiner

UNITED STATES PATENTS 2,510,054 6/1950 Alexander et al. _____ 332—9 X
2,862,186 11/1958 Aigrain _____ 332—11

HERMAN KARL SAALBACH, *Primary Examiner.*

ROY LAKE, *Examiner.*

P. L. GENSLER, *Assistant Examiner.*